(12) United States Patent
Ripoll (10) Patent No.: US 9,280,428 B2
(45) Date of Patent: Mar. 8, 2016

(54) METHOD FOR DESIGNING A HYPER-VISOR CLUSTER THAT DOES NOT REQUIRE A SHARED STORAGE DEVICE

(71) Applicant: Neftali Ripoll, Dover, DE (US)

(72) Inventor: Neftali Ripoll, Dover, DE (US)

( * ) Notice: Subject to any disclaimer, the term of this patent is extended or adjusted under 35 U.S.C. 154(b) by 186 days.

(21) Appl. No.: 13/868,221

(22) Filed: Apr. 23, 2013

(65) Prior Publication Data

US 2014/0317438 A1    Oct. 23, 2014

(51) Int. Cl.
G06F 11/00    (2006.01)
G06F 11/20    (2006.01)

(52) U.S. Cl.
CPC ........ G06F 11/2035 (2013.01); G06F 11/2017 (2013.01); G06F 11/2043 (2013.01); *G06F 11/2028* (2013.01); *G06F 11/2046* (2013.01); *G06F 11/2094* (2013.01); *G06F 11/2097* (2013.01); *G06F 2201/815* (2013.01)

(58) Field of Classification Search
CPC ............ G06F 11/2002; G06F 11/2017; G06F 11/201; G06F 11/2043; G06F 11/2046
See application file for complete search history.

(56) References Cited

U.S. PATENT DOCUMENTS

| 6,609,213 | B1 | 8/2003 | Nguyen | |
|---|---|---|---|---|
| 6,944,785 | B2 * | 9/2005 | Gadir et al. | 714/4.11 |
| 7,028,218 | B2 * | 4/2006 | Schwarm et al. | 714/11 |
| 7,287,186 | B2 | 10/2007 | McCrory | |
| 2006/0248198 | A1 * | 11/2006 | Galchev | 709/227 |
| 2007/0136393 | A1 * | 6/2007 | Fung et al. | G06F 11/474 1/1 |
| 2008/0133869 | A1 * | 6/2008 | Holt | 711/173 |
| 2009/0172125 | A1 * | 7/2009 | Shekhar et al. | 709/215 |
| 2012/0179771 | A1 * | 7/2012 | Ganti et al. | 709/213 |

* cited by examiner

*Primary Examiner* — Yolanda L Wilson (57) ABSTRACT

A system for storing and processing information comprises a plurality of nodes, each node comprising: a local information storage medium; a data connection configured to connect to at least one linked client; and a processor configured to process information in the local information storage medium and send processed information to the at least one linked client, and a secondary shared storage medium connected to the plurality of nodes via a shared data connection and configured to store information copied from the local information storage medium of each of the plurality of nodes, wherein each of the nodes in the plurality of nodes is configured, in the event of failure of a failed one of the plurality of nodes, to connect to the at least one linked client corresponding to the failed one of the plurality of nodes.

10 Claims, 7 Drawing Sheets

METHOD FOR DESIGNING A HYPER-VISOR CLUSTER THAT DOES NOT REQUIRE A SHARED STORAGE DEVICE

BACKGROUND OF THE INVENTION

This invention relates generally to the field of virtual Machines (VM's) and clustering of hyper-visor nodes. Mainly to improving density of virtual machines (VM's), throughput of data, and cost by modifying the method and design of creating a hyper-visor cluster. Hyper-visors are operating systems with a file system are used to run virtual machine(s). virtual machines are colloquially referred to as operating system environments (which has its own file system) that can be run within another operating system known as the host OS, but act independently from the host operating system and the host operating systems file system. The host operating system environment is colloquially known as a hyper-visor, and allows the system to boot off local hardware. Clustering of hyper-visor nodes allows for High-availability (HA). High availability allows a system to sustain a level of failures amongst the components that make up the system. The nodes of the cluster have network connections between them and to shared storage systems.

Hyper-visor clusters typically consist of one or more computers known as nodes. Each node has an operating system meant for loading and running virtual machines, known as a hyper-visor. These nodes are then typically connected to a shared storage system through a system of data connection and switching devices generally known as a storage area network (SAN), however the storage systems are also colloquially known as SANs, SAN storage, or SAN devices. This is demonstrated in FIG. 1. These SAN devices store file system data mainly for Virtual machines on their local disks usually in some form of RAID array. When nodes of the cluster boot, there hyper-visor connects to the SAN devices, and runs one or more virtual machines off the SAN storage but using the nodes local resources to run the Operating system including but not limited to CPU, Memory, and network connections.

Another pre-existing example of creating a hyper-visor cluster is to have nodes usually between 2 or 3 that do not use a shared storage system to hold Virtual machine data. Each node stores virtual machine data on local disks. Then to achieve High availability, the nodes replicate or mirror data between themselves on to each other's local disk. The replication happens over a network connection either dedicated or not, but usually dedicated. This method is demonstrated in FIG. 2.

Both of the previous typical examples for Hyper-visor clusters, provide a level of High availability and redundancy when implementing a Hyper-visor cluster, each with its own benefits. Additionally many businesses and industries are starting to realize the benefits of utilizing virtual machines in the organizations. However, both can become prohibitively expensive and each has certain drawbacks. The shared storage method requires non-blocking switch fabric to connect the nodes to the Shared storage system additionally this fabric has to be redundant. The storage system, because it has to service read write transactions from multiple nodes, requires expensive equipment and software to keep up with performance requirements to maintain expected performance. The drawback to this is that since each node connects to the shared storage its own designated space for internal storage goes unused, this creates increased space utilization ratio to the amount of VM's that can be run.

The non-shared storage drawback is that since its local storage has to be shared between 2 or more nodes, actual utilization of the disk has to be reserved. As well as each nodes disk activity is increased in accordance to the amount of nodes replicating to it. The other limitation is that since each node is limited to the amount of other nodes it can replicate data with; it has to make sure it reserves enough memory to support a failover. This can mean that in a failover event the load for a node can increase from 50% to 100%.

As can be seen, there is a need for solutions to these and other problems.

SUMMARY OF THE INVENTION

In general, the invention provides an alternate method for creating a high available hyper-visor cluster having two or more independent nodes also known as physical servers. There is no requirement for shared storage to be running for normal operation, and nodes are not configured in a master slave configuration. Each node communicates to other nodes, clients, and storage systems using one or more connectivity's. In normal operation, each node runs its own virtual Machines from its local private storage. Each node replicates its data to a shared storage using a computer program or software. The shared storage volumes that hold the replicated data from each node is accessible by other nodes that are part of the cluster. Each node and storage systems health is monitored using heartbeat communication. Only In the event of a failure of a node or one of its components, the healthy nodes of the cluster connect to the failed nodes replication data volume on the shared storage system and run virtual machines off the shared storage over one or more network connections, but using local resources to process data. Local resources include but not limited to CPU, memory, networking. Data communication can happen over fiber channel, ISCSI, infiniband, or any other such technologies. When restoring failed virtual machines, the load is balanced amongst the healthy nodes.

In a different failover event where a storage system experiences a failover instead of a node, virtual machines and cluster experiences no failover event. Even if there are multiple storage systems for redundancy and they all fail or if the storage Area network equipment experiences a failure, the cluster does not experience a failover event and performance is not affected.

When a failed node or storage system comes back online, before it's ready to run virtual machines and other services, a computer programs runs then checks the consistency of the lost storage and starts replicating data to bring all data volumes up-to-date and re-synced. Once all storage volumes are replicating appropriately, then the virtual machines can be returned back to the restored node.

If it is the shared storage that is being recovered the same re-synchronization process must happen, but it cannot sustain a node failure event until the data volumes are up to date and synchronizing appropriately.

In one aspect of the present invention, a system for storing and processing information comprises: a plurality of nodes, each node comprising: a local information storage medium; a data connection configured to connect to at least one linked client; Where a client can be any connected computing device such as a handheld device, pc, or server; and a processor configured to process information in the local information storage medium and send processed information to the at least one linked client; and a secondary shared storage medium connected to the plurality of nodes via a shared data connection and configured to store information copied from the local information storage medium of each of the plurality of nodes, wherein each of the nodes in the plurality of nodes is configured, in the event of failure of a failed one of the plurality of nodes, to perform the following steps, except for the failed one: communicate with the secondary shared storage medium via the shared data connection; receive at least a portion of information copied from the local information storage medium of the failed one of the plurality of nodes; and connect to the at least one linked client corresponding to the failed one of the plurality of nodes.

In one aspect, each of the plurality of nodes comprises a plurality of partitions, each partition having a volume on its corresponding node and utilizing processing power of its corresponding processor so as to create a virtual machine. In one aspect, each partition is configured to run an operating system independently of other partitions. In one aspect, in the event of failure of the failed one of the plurality of nodes, at least one virtual machine of the plurality of nodes is configured to replicate a processing of the failed one of the plurality of nodes. In one aspect, the at least one virtual machine of the plurality of nodes is configured to read information copied from the local information storage medium of the failed one of the plurality of nodes from the secondary shared storage medium. In one aspect, the plurality of nodes, except for the failed one, is configured to perform the step of sending processed information to the at least one linked client of the failed one of the plurality of nodes. In one aspect, the information received from the local information storage medium of each of the plurality of nodes is used by the plurality of nodes only upon failure of at least one of the plurality of nodes. In one aspect, the secondary shared storage medium has a storage capacity more than a sum of storage capacities of the local information storage media of the plurality of nodes. In one aspect, the secondary shared storage medium is configured to copy information from the local information storage medium of each of the plurality of nodes at an ongoing pace so that at any given time, the secondary shared storage medium contains a copy of all local information storage media of the plurality of nodes. In one aspect, the secondary shared storage medium is configured to copy information from the local information storage medium of each of the plurality of nodes at an ongoing pace so that at any given time, the secondary shared storage medium contains a copy of all local information storage media of the plurality of nodes of at most one minute prior.

In one aspect, a system for storing and processing information comprises: a machine; and a program product comprising machine-readable program code for causing, when executed, the machine to perform the following process steps: connecting to a plurality of nodes via a shared data connection, each node comprising: a local information storage medium; a data connection configured to connect to at least one linked client; and a processor configured to process information in the local information storage medium and send processed information to the at least one linked client; copying and storing information copied from the local information storage medium of each of the plurality of nodes; detecting a failure of a failed one of the plurality of nodes; communicating with each of the plurality of nodes, except the failed one, via the shared data connection; transmitting a copy of at least a portion of information copied from the local information storage medium of the failed one of the plurality of nodes to each of the plurality of nodes except the failed one; and causing the plurality of nodes except the failed one to send processed information to the at least one linked client of the failed one of the plurality of nodes.

In one aspect, a method for storing and processing information, comprising: connecting to a plurality of nodes via a shared data connection, each node comprising: a local information storage medium; a data connection configured to connect to at least one linked client; and a processor configured to process information in the local information storage medium and send processed information to the at least one linked client; copying and storing information copied from the local information storage medium of each of the plurality of nodes; detecting a failure of a failed one of the plurality of nodes; communicating with each of the plurality of nodes, except the failed one, via the shared data connection; transmitting a copy of at least a portion of information copied from the local information storage medium of the failed one of the plurality of nodes to each of the plurality of nodes except the failed one; and causing the plurality of nodes except the failed one to send processed information to the at least one linked client of the failed one of the plurality of nodes.

These and other features, aspects and advantages of the present invention will become better understood with reference to the following drawings, description and claims.

BRIEF DESCRIPTION OF THE DRAWINGS

The details of the implementation of the invention are set forth in the accompanying drawings and the description below. These and other features and advantages will become better understood from the descriptions, the drawings, and the claims. The reference characters refer to the same parts throughout the different views. The drawings are not necessarily to scale; the focus instead was places on showing the logic and principles of the inventions

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention. For instance anywhere where the term 'receive' found, is not limiting but can also be used to mean 'acquire', obtain, copy, etc. Also the tern 'linked client' can represent any computing device acting as a client such as a mobile device, personal computer, or server.

One embodiment of the present invention may include one or more of the following elements and/or method steps:

1. Nodes have virtual machines (VM) run from local storage primarily.

2. Use a hardware or software solution to replicate, synchronize, or mirror VM data to separate shared storage location such as SAN/NAS, clustered file system, ISCSI target, or other location that can be shared by other node(s) in cluster.

3. All nodes in the cluster can share a location for replicated and HA data.

4. When a node failure happens, the recovered virtual machines (VMs) can be load balanced among the other active nodes so to reduce the resource burden required to recover all the VMs from the lost node.

5. May require two or more nodes with similar architecture.

6. Nodes run independently of each other.

7. Since each node is to run independently and be able to scale, performance and density capabilities of each node should be tailored to meet criteria that does not impede on any elements stated prior that makes up the components of the present invention.

8. Implement hypervisor cluster solution.

One embodiment of the present invention is described here. Since the nodes have virtual machines run from local storage primarily, in order to maintain high availability, each node needs to have hardware and software solutions that maintain continuous replication, mirroring, and synchronization to a SAN/NAS, clustered files system, or other shared storage location accessible by the other nodes. Replication communication can happen over Fiber Channel, ISCSI, Infiniband, or any other such technologies. In the event of a downed node or need for a fail over event to occur, the other nodes are be able to start the replicated VMs from the replicated location on the shared storage, and the VM recovery may be load balanced across the active healthy nodes.

Figure 1:
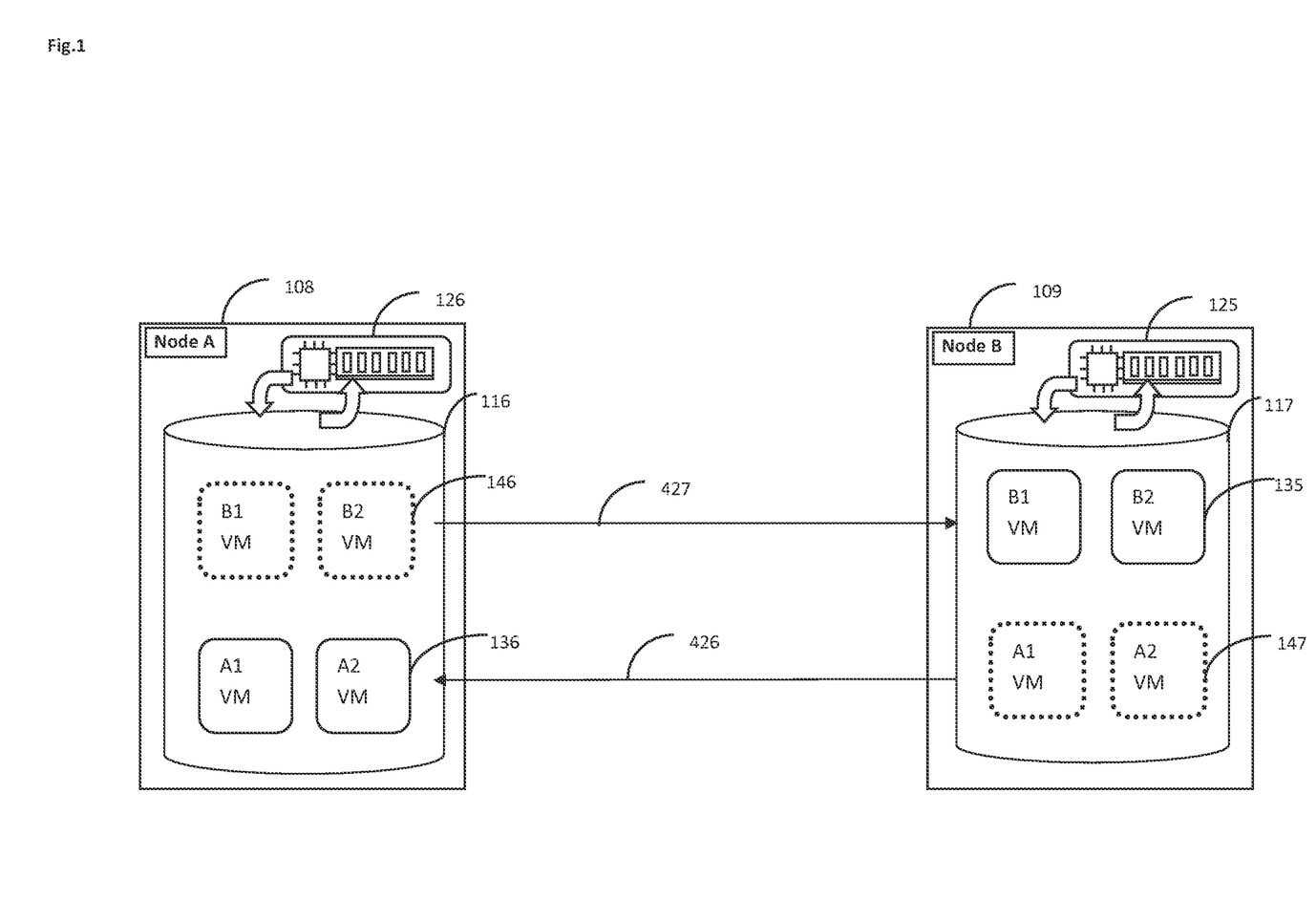
FIG. 1 shows a system diagram of a typical existing method to a hyper visor cluster utilizing non shared storage.

This means that each node only needs to start up a portion of the VMs that were on the failed node; this reduces the resources needed for failover as opposed to some pre-existing High available hyper-visor (HA) cluster implementations requiring a 1:1 or 1:2 ratio FIG. 1. Since nodes don't shared storage space for active VM (input/output) I/O, like in a traditional hyper-visor cluster FIG. 2, the nodes truly are independent of each other. Since nodes are independent in order for them to be able to scale the number of VMs hosted, the hardware and software used may need to be able to support a higher density of virtual machines. This is the reason for the need of mirroring and real-time replication to a separate shared storage.

As a result of independent functionality, central management software may be needed to allow for efficient scalability and Failover (high availability). Because these elements are crucial to allow single nodes to maintain failover capabilities, software and hardware choices for any implementation need to make sure the previous mentioned steps are not impeded or mitigated. If these criteria are combined with specific hardware and software solutions, VM densities can be increased.

One embodiment working of the present invention is described here. By following the above-listed criteria and method one could implement a scalable, highly available hypervisor cluster solution that costs much less in hardware and software, lower electrical usage, and reduce the footprint of the solutions while greatly increasing the density of the amount of VMs that can be hosted without taxing resources.

The if-then relationship that exists in this process is with the high availability and failover capabilities. During normal operation the working data and virtual machines are running off local storage. The virtual machine data is being replicated to a shared location which is an exact mirror of the local data. If there is an event that causes loss of a node, another node that is connected to the shared location will start up the VMs from the shared location. Depending on the amount of nodes in a cluster the failed hosts virtual machines will be divided (load balanced) between the remaining active nodes by the amount of nodes. For example, if the failed host had 3 VMs and the cluster contained 4 host servers, each active node could recover one VM, lowering resource requirements. If the failed node is recovered it will connect to the original shared location of the replication data and start synchronizing VM data back to local storage. When is up to date and ready to replicate in real time, the original host will take over operation of hosting the VMs.

One embodiment of use of the present invention is described here. Although central management may be necessary for management of nodes, the cluster can essentially function without central management but may be harder to maintain. Additionally if the hardware or software for each node does not support a higher density of virtual machines the overall process may still function but would not be able to achieve the potential scalability it would allow for.

By using the criteria listed above, one could create a highly available hypervisor cluster that is more energy efficient and drastically cheaper than conventional methods.

Referring now to the figures, FIG. 1 illustrates one pre-existing method, which uses a two-way replication method, where no shared disks are used at all. Each node 108, 109, has a boot OS or hypervisor that runs virtual machines using local resources such as CPU and memory 125, 126 and loads the virtual machines from local non-shared disks 116, 117. Through either a dedicated or non-dedicated network links 426, 427, the file system and virtual machines 135-136 from each node private disks 116 are replicated in continuously to the other node's disk 117 to act as standby for high availability. Each host systems boot OS or hypervisor 125, 126 are aware of the standby or replicated data 146, 147 from the other system. In the event of a failure, the system holding the replicated data brings the virtual machines automatically back online.

Figure 2:
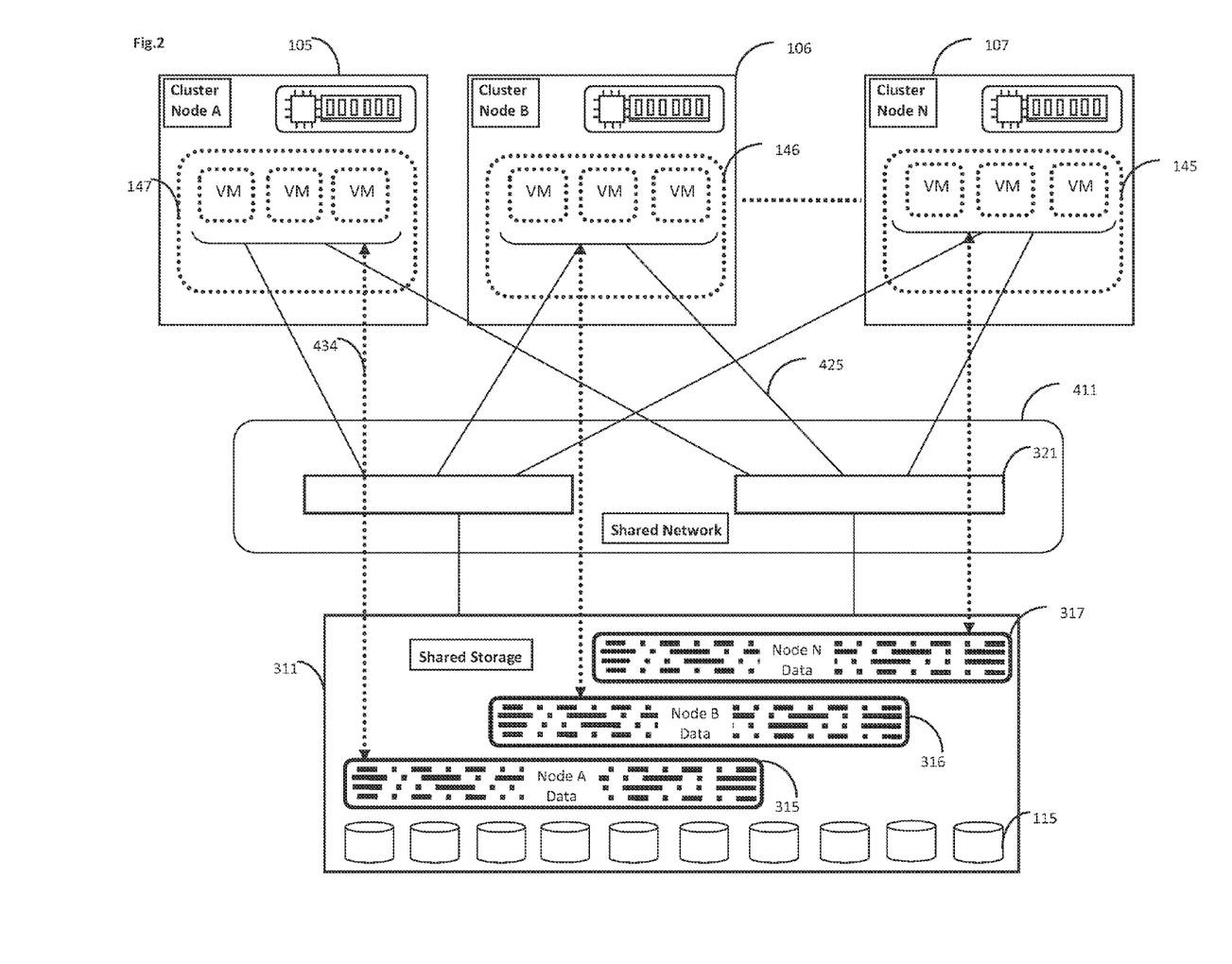
FIG. 2 shows a system diagram of a typical existing method to a hyper-visor cluster utilizing shared storage.

Referring now to the figures, FIG. 2 shows the conventional legacy method for a hyper visor cluster using shared storage. Here each host node 105-107 will connect via information path 434 to a mounted file system 315-317 on a shared storage system 311. The storage system is where all the drives are located for storing data 115. Within each mounted file system 315-317 each node loads and runs virtual machines 145-147. Since the virtual machines are not stored on any one node, it allows for the virtual machine to be moved from one host node to another 105-107. The nodes are connected to the shared storage via a network medium 425 such as fiber channel, Ethernet, or others to a storage network 411 that usually has redundant paths 425 and switching systems 321 that allows for fault tolerance.

Figure 3:
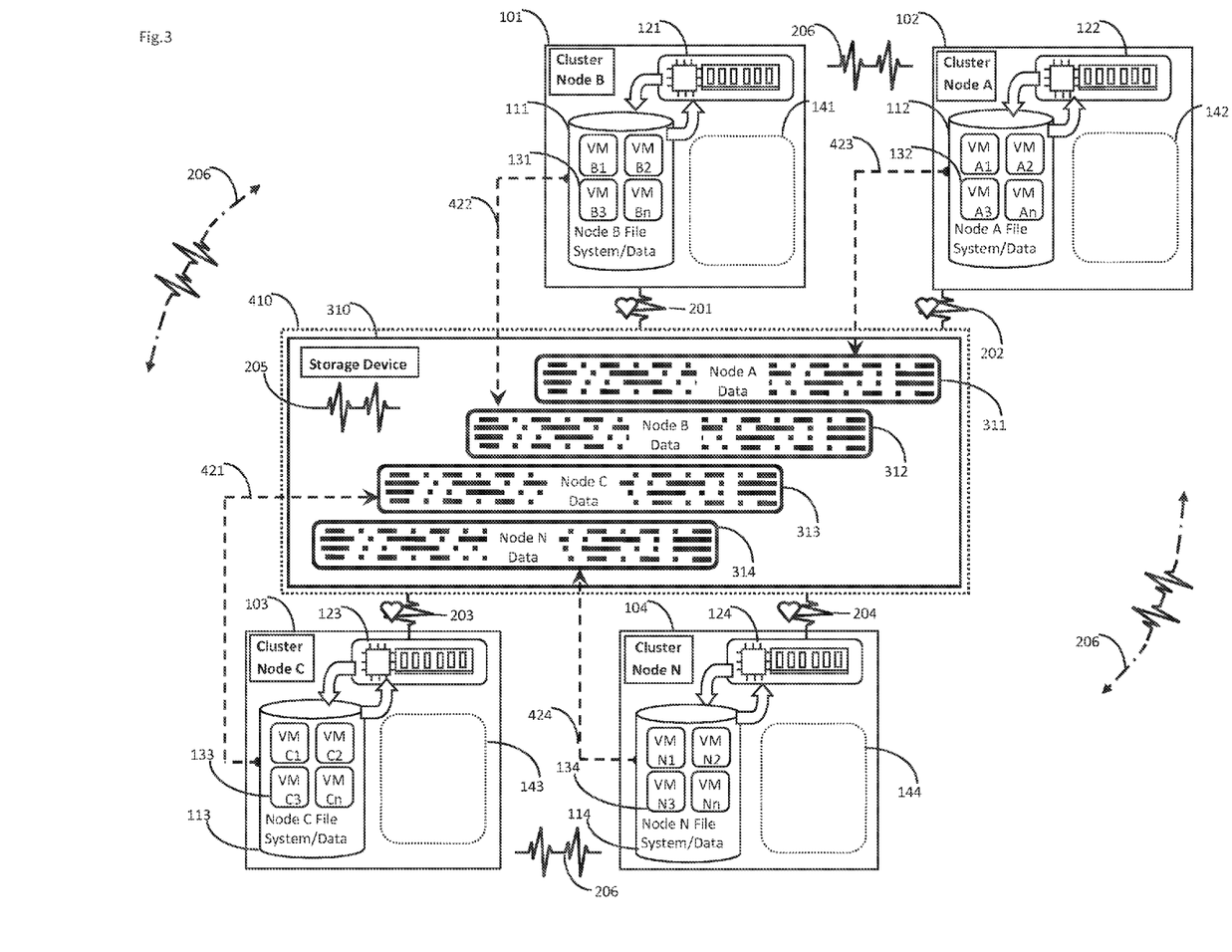
FIG. 3 shows a system diagram according to one embodiment of the present invention.

Referring now to the figures, FIG. 3 illustrates a method for a high availability cluster in a normal running state for each node 101-104, according to one embodiment of the present invention. When running healthy each cluster node accesses its local private resources including private local storage, CPU and memory 121-124, and does not run any virtual machines from a shared disk, SAN, or NAS 310. Each virtual machine file system 131-134 is written to and read from locally. Each node however replicates its data to a shared storage device in real-time via information links 421-424; replication can occur over any network connection but is recommended to have a dedicated replication network. Each node replicates to its own space on the shared storage device 311-314, but each node is aware of the others' replicated data. This is needed in the event of a failure where remaining nodes are able to bring failed services back on line using their resources 114 and access to the shared storage.

The cluster monitors all the nodes and storage device through a heartbeat communication 201-206 that can occur over any available network connection 206 and does not require a dedicated heartbeat network. Although a heartbeat can occur over any network a failure or high availability event only needs to occur if connectivity to a node from either a client or public network is lost 410; if a heartbeat or connectivity is lost over a storage network 421-424, fail over is not needed since each node relies on local storage for providing virtual machine services 111-114.

Figure 4:
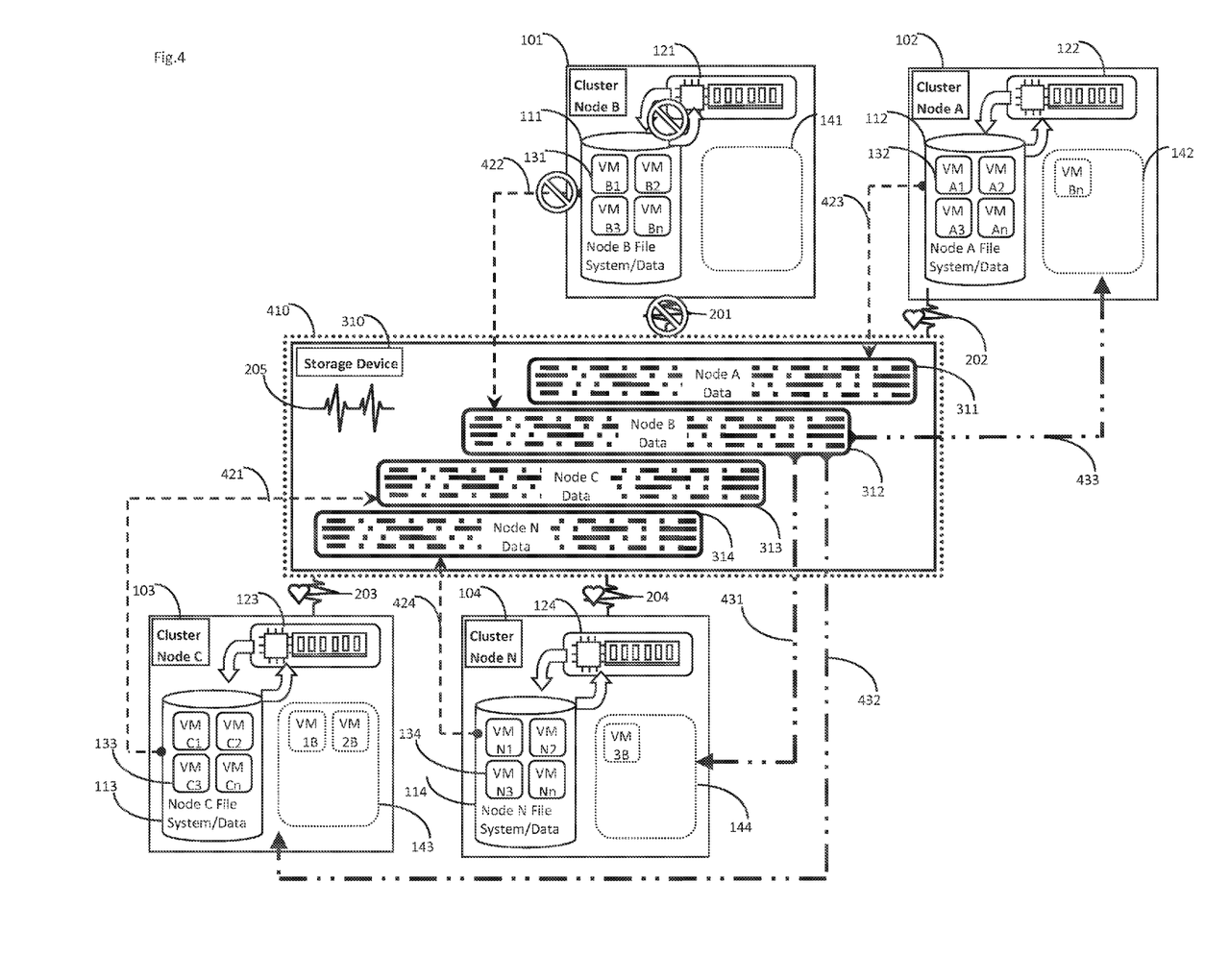
FIG. 4 shows a system diagram according to one embodiment of the present invention where a failure event has occurred

Referring now to the figures, FIG. 4 illustrates when one of the nodes 101-104 would fail; this could either be from a disk failure where the hypervisor or boot OS no longer can run services or virtual machines 121 or if network connectivity is lost resulting in a failed heartbeat 201. This triggers the other still running nodes 102-104 to connect to the replicated data from node B 312 on the shared storage unit. The replicated data store 312 from nodeB 101 holds the data of the virtual machines 131 as it was when nodeB 101 failed because of real-time replication 422. The still active nodes automatically restore the failed node VMs 431-433 and distribute load using the still active nodes resources 142-144.

Figure 5:
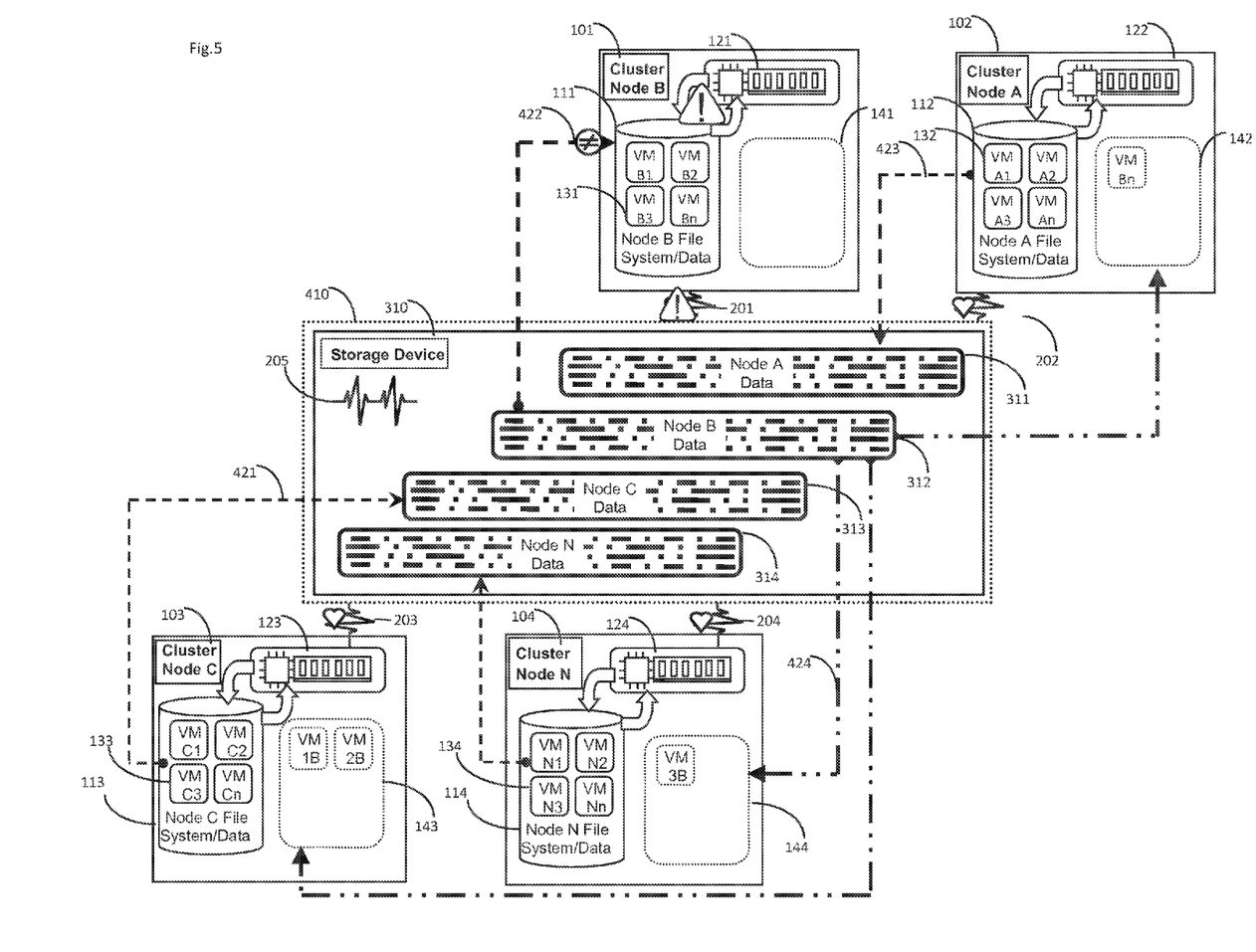
FIG. 5 shows a system diagram according to one embodiment of the present invention where a recovery process occurs.

Referring now to the figures, FIG. 5 illustrates when a failed node is restored 101. When a failed node comes back online it may re-establish a heartbeat to the cluster but the system is not yet ready to become active 201. The node does not have its data 131 on its local disks 111 up to date and in-sync 422 with the latest activity of its virtual machines 142-144 loaded on the other cluster nodes 102-104. Until the restored node data becomes fully synced in real time with the latest activity of its virtual machines 142-144 it will stay in an 'online but not ready state' not loading its own VMs. This ensures the data integrity of the virtual machines' volumes.

Figure 6:
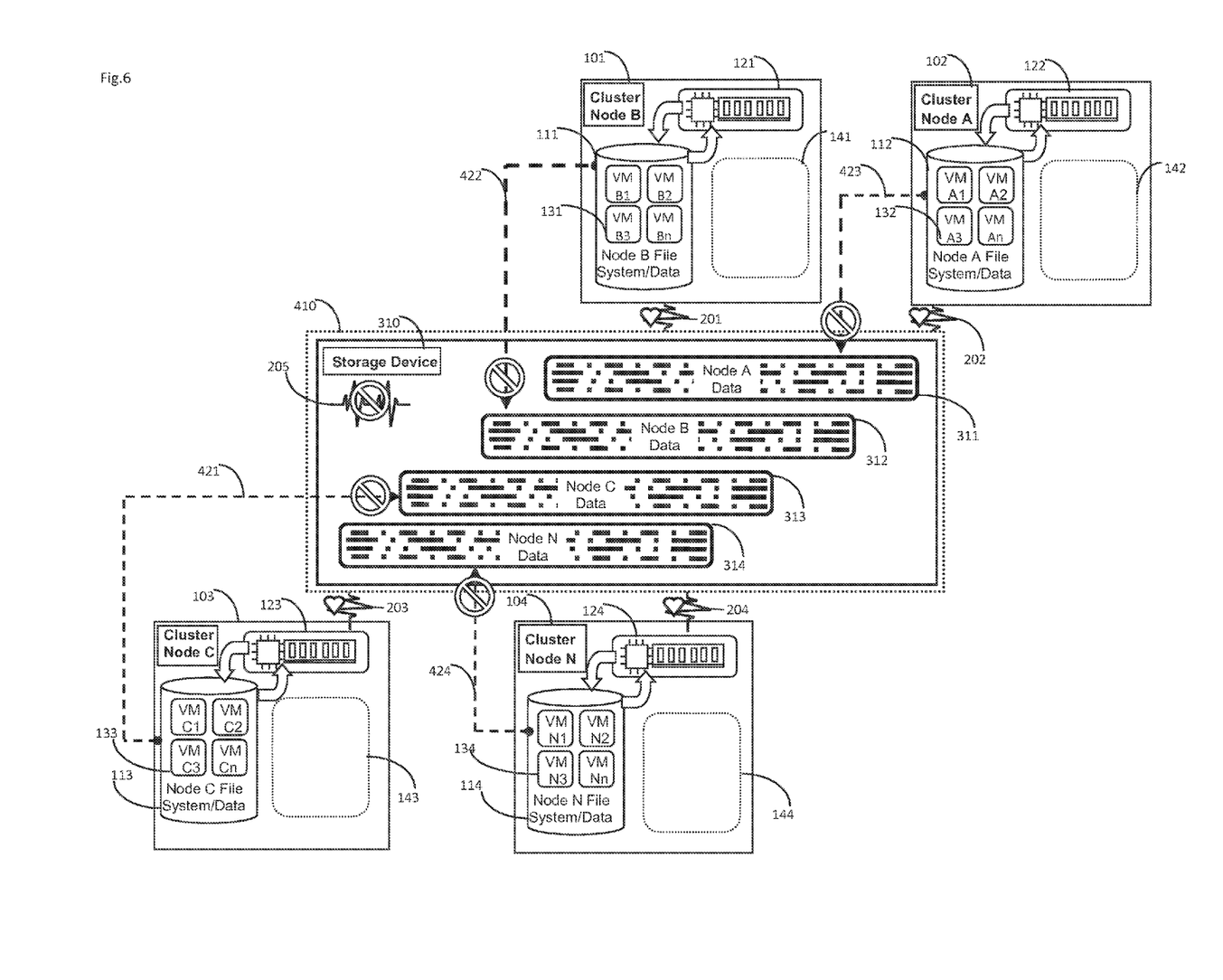
FIG. 6 shows a system diagram according to one embodiment of the present invention where a failure event has occurred.

Referring now to the figures, FIG. 6 shows what happens if instead of a node failure the storage device fails 410 and/or loses its heartbeat connectivity 205. In this situation all nodes 101-104 continue to run unaffected 202. However the real-time replication 422-424 stops. In this scenario although the nodes maintain normal status, if a node were to fail while the storage system is unavailable it would cause the nodes VMs 131-134 to not be restored automatically. This can be mitigated by introducing a second storage system that also participates in real-time replication with both the storage system and the virtual machine cluster nodes.

Figure 7:
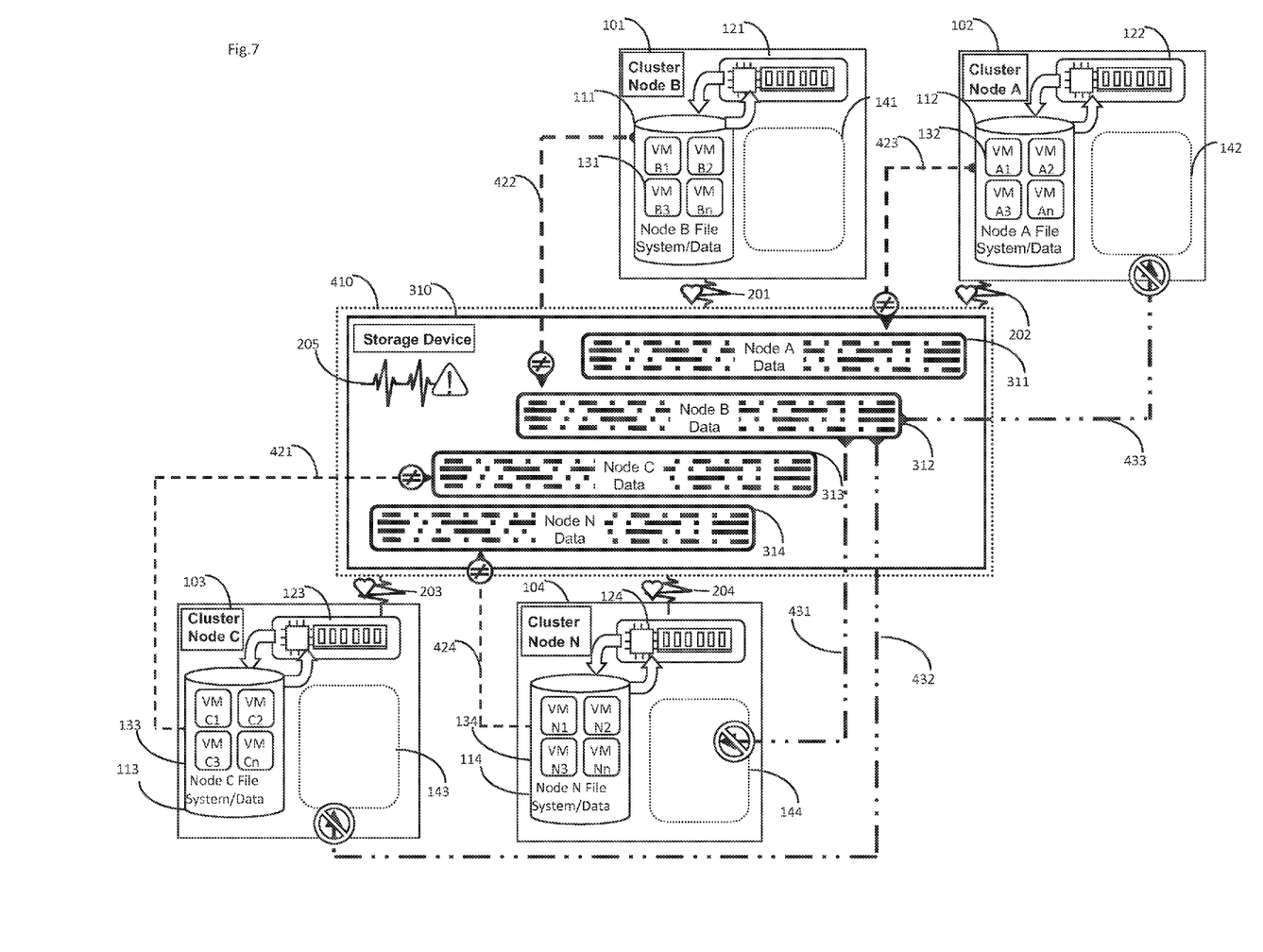
FIG. 7 shows a system diagram according to one embodiment of the present invention where a recovery process occurs.

Referring now to the figures, FIG. 7 shows that once a failed storage unit comes back online it is not yet ready 205. Its data from each node is not equal to the nodes 311-314; until its replicated data 311-314 is back in line and synced 422-424 with the virtual machine data 131-134 from the cluster nodes 101-104 it won't be ready for use 205. Only when data is synced and kept up in real time, will the storage unit be considered ready and accessible for node failover events, as in FIG. 3.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet.

In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention.

What is claimed is:

1. A system for providing a highly available hyper-visor cluster of independently functioning nodes, comprising:
    a plurality of nodes, each node comprising: a local information storage medium; a data connection configured to connect to at least one linked client; and a processor configured to process information in the local information storage medium and send processed information to the at least one linked client; and
    a secondary shared storage medium connected to the plurality of nodes via a shared data connection and configured to store information copied from the local information storage medium of each of the plurality of nodes,
    wherein each of the nodes in the plurality of nodes is configured, only in the event of failure of a failed one of the plurality of nodes, to perform the following steps, except for the failed one:
        communicate with the secondary shared storage medium via the shared data connection;
        receive at least a portion of information copied from the local information storage medium of the failed one of the plurality of nodes; and
        connect to the at least one linked client corresponding to the failed one of the plurality of nodes,
    whereby each of the nodes in the plurality of nodes is configured to only access its corresponding local information storage medium and its corresponding processor except in the event of failure.

2. The system as claimed in claim 1, wherein each of the plurality of nodes comprises a plurality of partitions, each partition having a volume on its corresponding node and utilizing only processing power of its corresponding processor so as to create a virtual machine, wherein the secondary shared storage medium is configured to not run any virtual machines except in said event of failure.

3. The system as claimed in claim 2, wherein each partition is configured to run an operating system independently of other partitions.

4. The system as claimed in claim 2, wherein in the event of failure of the failed one of the plurality of nodes, at least one virtual machine of the plurality of nodes is configured to replicate a processing of the failed one of the plurality of nodes.

5. The system as claimed in claim 4, wherein the at least one virtual machine of the plurality of nodes is configured to read information copied from the local information storage medium of the failed one of the plurality of nodes from the secondary shared storage medium.

6. The system as claimed in claim 1, wherein the plurality of nodes, except for the failed one, is configured to perform the step of sending processed information to the at least one linked client of the failed one of the plurality of nodes.

7. The system as claimed in claim 1, wherein the information received from the local information storage medium of each of the plurality of nodes is used by the plurality of nodes only upon failure of at least one of the plurality of nodes.

8. The system as claimed in claim 1, wherein the secondary shared storage medium has a storage capacity more than a sum of storage capacities of the local information storage media of the plurality of nodes.

9. The system as claimed in claim 1, wherein the secondary shared storage medium is configured to copy information from the local information storage medium of each of the plurality of nodes at an ongoing pace so that at any given time, the secondary shared storage medium contains a copy of all local information storage media of the plurality of nodes.

10. The system as claimed in claim 1, wherein the secondary shared storage medium is configured to copy information from the local information storage medium of each of the plurality of nodes at an ongoing pace so that at any given time, the secondary shared storage medium contains a copy of all local information storage media of the plurality of nodes of at most one minute prior.

* * * * *